United States Patent
Fu et al.

(10) Patent No.: US 7,064,509 B1
(45) Date of Patent: Jun. 20, 2006

(54) APPARATUS FOR DC MOTOR POSITION DETECTION WITH CAPACITIVE RIPPLE CURRENT EXTRACTION

(75) Inventors: Zhenxing Fu, Ann Arbor, MI (US); Karienne A. Yockey, Ypsilanti, MI (US); Frank J. Aiello, Canton, MI (US); James R. Winkelman, Bloomfield, MI (US); Frank J. Haas, Northville, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 11/079,644

(22) Filed: Mar. 14, 2005

(51) Int. Cl.
*H01R 39/46* (2006.01)

(52) U.S. Cl. ............... 318/439; 318/138; 318/254; 318/244; 318/246; 318/253; 318/293

(58) Field of Classification Search ........... 318/138, 318/254, 439, 700, 430–434, 244–252, 293
See application file for complete search history.

(56) References Cited

U.S. PATENT DOCUMENTS

| | | | |
|---|---|---|---|
| 3,792,330 A * | 2/1974 | Ottoson | 318/269 |
| 3,809,984 A * | 5/1974 | Hoge | 318/244 |
| 4,086,983 A * | 5/1978 | Anzai et al. | 187/297 |
| 4,319,170 A | 3/1982 | Brent | |
| 4,710,686 A | 12/1987 | Guzik | |
| 5,028,852 A * | 7/1991 | Dunfield | 318/254 |
| 5,153,492 A | 10/1992 | Landseadel | |
| 5,343,382 A * | 8/1994 | Hale et al. | 363/98 |
| 5,459,654 A | 10/1995 | Williams et al. | |
| 5,514,977 A * | 5/1996 | Agiman | 324/772 |
| 5,552,683 A | 9/1996 | Dargent | |
| 5,577,153 A * | 11/1996 | Bocchiola | 388/811 |
| 5,640,073 A * | 6/1997 | Ikeda et al. | 318/439 |
| 5,675,231 A | 10/1997 | Becerra et al. | |
| 5,760,555 A | 6/1998 | Yamano et al. | |
| 5,764,009 A | 6/1998 | Fukaya et al. | |
| 5,796,194 A | 8/1998 | Archer et al. | |
| 5,798,624 A | 8/1998 | Wilke et al. | |
| 5,811,948 A * | 9/1998 | Sato et al. | 318/434 |
| 5,818,178 A | 10/1998 | Marumoto et al. | |
| 5,825,597 A | 10/1998 | Young | |
| 5,859,519 A | 1/1999 | Archer | |
| 5,875,281 A * | 2/1999 | Thexton et al. | 388/801 |
| 5,969,919 A | 10/1999 | Kobayashi et al. | |
| 6,078,154 A * | 6/2000 | Manlove et al. | 318/293 |
| 6,078,155 A * | 6/2000 | Tominaga et al. | 318/293 |
| 6,100,622 A * | 8/2000 | Yamamoto et al. | 310/316.01 |
| 6,252,363 B1 * | 6/2001 | Grady | 318/266 |

(Continued)

FOREIGN PATENT DOCUMENTS

EP 1267479 A1 * 12/2002

*Primary Examiner*—Rina Duda
*Assistant Examiner*—Tyrone Smith
(74) *Attorney, Agent, or Firm*—Brinks Hofer Gilson & Lione

(57) ABSTRACT

An apparatus for determining angular positions of DC motor includes a capacitor connected in parallel with the DC motor. The current flowing through the capacitor, at any given time, is an AC ripple current responsive to a commutation event of the DC motor. The capacitor partially sources the motor current ripples during commutation and recharges itself during the off-commutation period. Since the number of commutation events per mechanical revolution is predetermined once the DC motor is designed, the frequency of the AC ripple currents through the capacitor corresponds to the frequency of commutation, and thus a motor position of the DC motor.

23 Claims, 3 Drawing Sheets

U.S. PATENT DOCUMENTS

| | | |
|---|---|---|
| 6,335,600 B1 | 1/2002 | Kasai et al. |
| 6,380,757 B1 * | 4/2002 | Draves et al. ............... 324/772 |
| 6,437,533 B1 * | 8/2002 | Du et al. .................... 318/560 |
| 6,545,439 B1 | 4/2003 | Kaeufl et al. |
| 6,556,053 B1 * | 4/2003 | Stanley ...................... 327/108 |
| 6,570,350 B1 | 5/2003 | Ohno et al. |
| 6,577,024 B1 * | 6/2003 | Kikuta et al. ............... 307/10.1 |
| 6,617,816 B1 | 9/2003 | Ohno et al. |
| 6,657,406 B1 * | 12/2003 | Enzinna et al. ............. 318/280 |
| 6,664,750 B1 | 12/2003 | Pelonis |
| 6,847,179 B1 * | 1/2005 | Du et al. .................... 318/560 |
| 6,906,483 B1 * | 6/2005 | Tominaga et al. .......... 318/293 |

* cited by examiner

APPARATUS FOR DC MOTOR POSITION DETECTION WITH CAPACITIVE RIPPLE CURRENT EXTRACTION

BACKGROUND

1. Field of the Invention

The present invention relates to position detection and control system for a Direct Current (DC) motor.

2. Description of Related Art

Often position control of a DC motor requires feedback about the position of the motor shaft. Typically, a position sensor, such as an optical or Hall Effect encoder, or resolver is used to obtain the motor shaft position. The use of a position sensor increases the cost, size and weight of the system, and reduces the reliability and environmental compatibility of the system. For applications where the output speed of the motor is rather low, such as an actuator that consists of a DC motor and a reduction gear mechanism, a potentiometer is also commonly used to sense the position of the output shaft. This position sensing technique, however, is known to have poor position accuracy, is sensitive to environmental conditions such as temperatures, has poor durability due to the mechanical contact between the wiper and the resistive trace, and has high system cost due to additional wiring required between the motor and the controller.

Another known technique for obtaining motor position information is sensing the motor current directly for detecting and counting the commutation pulses as disclosed in U.S. Pat. No. 5,798,624, in which the current flowing through the lower legs of the H-bridge, same as the motor current, is monitored directly by a current sensing mechanism. The converted voltage signal of the sensed current is conditioned by using a band pass filter for extracting the commutation pulses and then fed to a pulse generator. The output of the pulse generator is then provided to a microprocessor for pulse counting to determine the motor position. Though the technique disclosed in U.S. Pat. No. 5,798,624 resolved several problems associated with the designs that use position sensors or potentiometers as mentioned above, it still suffers drawbacks. For example, it requires a special H-bridge if the sensor is located in the lower legs of the switches for capturing pulses during braking mode. Further, the system would require two sensors for bi-directional operations thereby increasing the cost of the system. If the sensor is located in the battery return, the system cannot capture commutation pulses in braking mode. In addition, the system has poor useful signal sensitivity/accuracy since the entire motor current including the main DC component is embedded in the sensor signal. The system may have pulse missing problems during start-up and stop coasting due to the use of a fixed band pass filter on the motor current signal. Further, the system may gain pulses due to brush bounces. Furthermore, since the main motor current goes through the current sensor, the system will have excessive voltage drops or power losses associated with the sensor. Also, the captured signal varies among production motors of the same design and over the life span of the same motor due to the use of current pulses associated with delayed commutation.

Yet another known technique for obtaining motor or actuator position information is sensing the motor terminal voltage directly for detecting and counting the commutation pulses as disclosed in U.S. Pat. No. 6,078,154, in which two high pass filters are used to capture the high frequency portion of the motor terminal voltage. The captured voltage signal is then fed through a low pass filter such that both DC component and high frequency noise in the sensed voltage signal are eliminated. The signal is further conditioned and fed to a pulse counter to determine motor position. This design solved the additional voltage drop and power loss problem that exists in U.S. Pat. No. 5,798,624. However, it still suffers significant drawbacks. The cost of the system is high due to the need for two current sources in the signal conditioning circuit and the need for a charge pump. Also, the system only works with MOSFET based H-bridge modules, not with bipolar transistors. The system may have pulse missing problems during motor start-up and stop due to the use of fixed-value high pass filters, and may have pulse gaining problems due to brush bounces. Furthermore, the captured signal may vary among production motors of the same design and over the life span of the same motor due to the use of current pulses associated with delayed commutation.

Still yet another known technique for obtaining motor position information is sensing the rate of change of motor current for detecting and counting the commutation pulses as disclosed in U.S. Pat. No. 6,437,533 B1. An inductor is placed at the lower side of the H-bridge to measure directly the rate of change of motor current as it flows through the lower legs of the H-bridge or through the battery return. The voltage across the inductor, $L*(di/dt)$, is monitored, conditioned, and fed to a pulse generator circuit. The output pulse train is then provided to a microprocessor for pulse counting thereby obtaining the position of the motor. This design offers high signal sensitivity and may eliminate missing pulse problems during regenerative braking mode. However, this approach requires the use of a special H-bridge to separate the GND between the FWD and the transistor switches. The system cannot use MOSFET-based H-bridges, otherwise it will miss pulses during the braking mode. Furthermore, since the main motor current has to go through the sensing inductor, excessive voltage drops or power losses will be present if a small inductor is used. The sensed signal may vary among production motors of the same design and over the life span of the same motor due to the use of current pulses associated with delayed commutation.

It is therefore desirable to design a DC motor position detection and control system that will eliminate or minimize the drawbacks associated with the above-mentioned prior art systems. Preferably such a desirable system would not require special H-bridge, or motor, or additional power supplies, would not add additional voltage drops and power losses from the pulse sensing circuit, would have a high useful signal to sensed signal ratio, would not have pulse gaining problem due to brush bounces, would not have pulse missing problems during startup, regenerative braking, or stop modes of operations, would have consistent captured signals for high volume produced motors or over the life span of the same motor, and is independent of the EMI suppression designs.

In view of the above, it is apparent that there exists a need for an improved position detection and control system for a DC electric motor.

SUMMARY

In satisfying the above need, as well as, overcoming the enumerated drawbacks and other limitations of the related art, the present invention provides an improved position detection system for a DC motor.

The position detection system eliminates shortcomings of the above-mentioned prior art systems. In accordance with the preferred embodiment of the present invention, a position detection system for obtaining motor position information includes a capacitive impedance element, shown as a capacitor, connected in parallel with the motor, and a capacitive current ripple detection apparatus. The capacitive current ripple detection apparatus captures the voltage across an impedance connected in series with the capacitor. The current ripple detection apparatus includes a signal conditioning circuit for filtering and amplifying the captured voltage signal, and a pulse generation circuit to generate a pulse train corresponding to motor communication events. The pulse train is provided to the input capture port of a microprocessor where position information is determined based on the pulse train.

The system provides a low cost option for obtaining the motor position information that does not require a special H-bridge, motor, or additional power supplies, by simply inserting a capacitive impedance element in parallel with the motor terminal.

The system provides a position sensing system that does not add excessive additional voltage drops and power losses by using capacitive sensing element in parallel with the main motor circuit such that main DC power does not go though the sensing circuit.

The system provides a position sensing system that will have a high useful signal to sensed signal ratio for high signal sensitivity and accuracy, which is inherently provided by the capacitor ripple currents.

The system provides a position sensing system that will not have pulse gaining problem due to brush bounces or pulse missing problem during startup, regenerative braking, or stop modes of operations, by inserting the sensing circuits directly across the motor terminals such that commutation events of the motor will not be missed by the sensing circuit.

The system provides a position sensing system that will have consistent captured signals for high volume produced motors or over the life span of the same motor and is independent of the EMI suppression designs, by not using pulses associated with delayed commutation.

Further objects, features and advantages of this invention will become readily apparent to persons skilled in the art after a review of the following description, with reference to the drawings and claims that are appended to and form a part of this specification.

DETAILED DESCRIPTION

Figure 1:
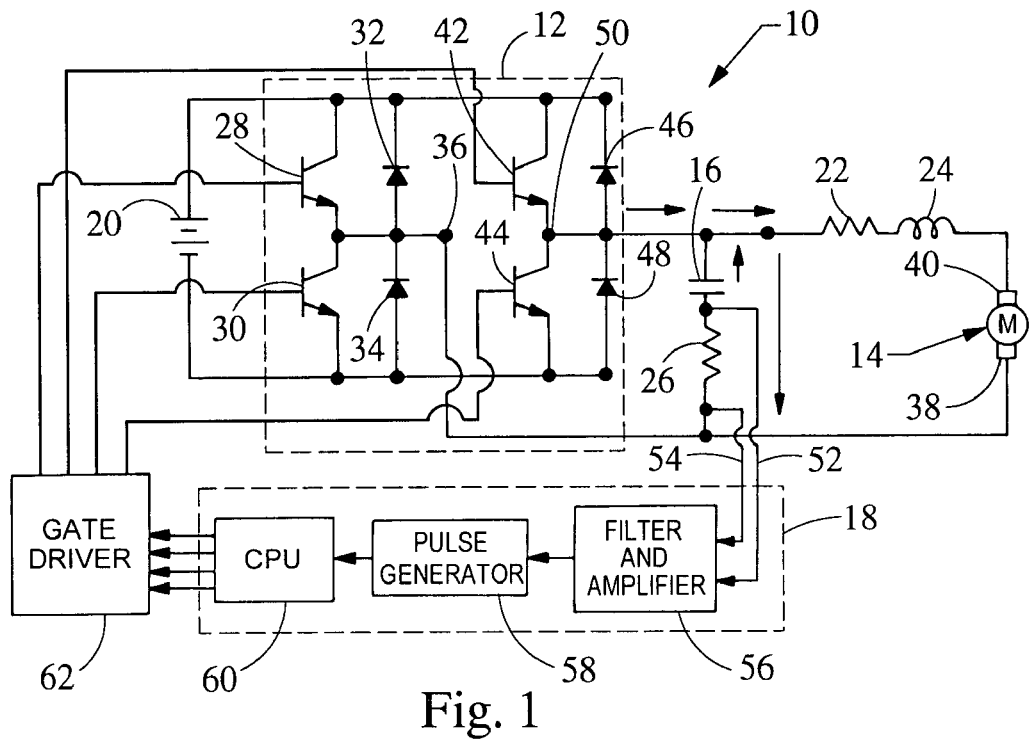
FIG. 1 is schematic drawing illustrating the preferred embodiment of the present invention.
Figure 4:
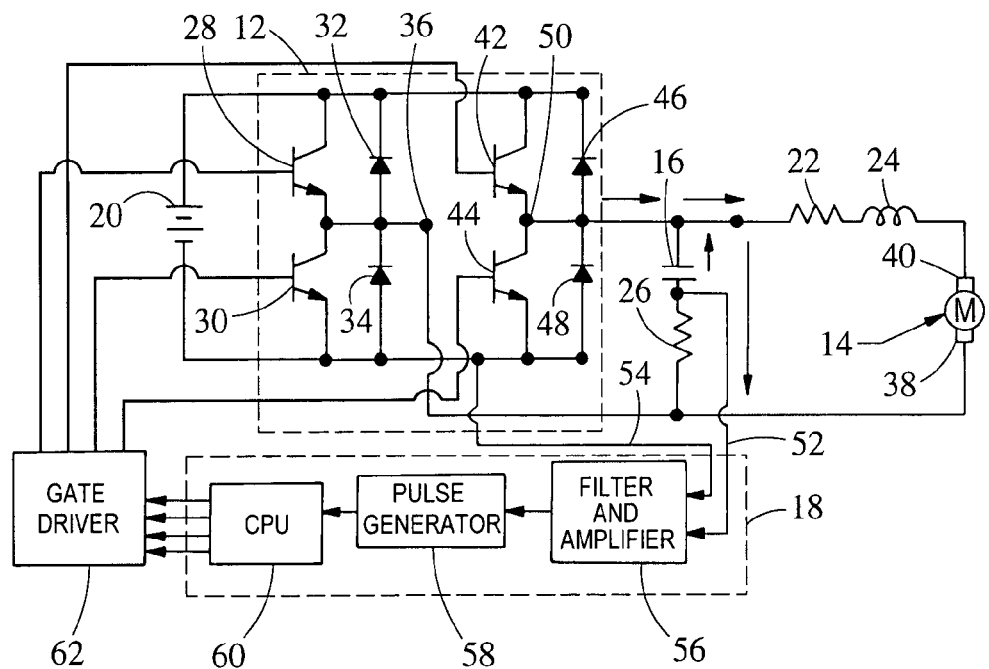
FIG. 4 is a schematic drawing illustrating another preferred embodiment of the present invention.
Figure 5:
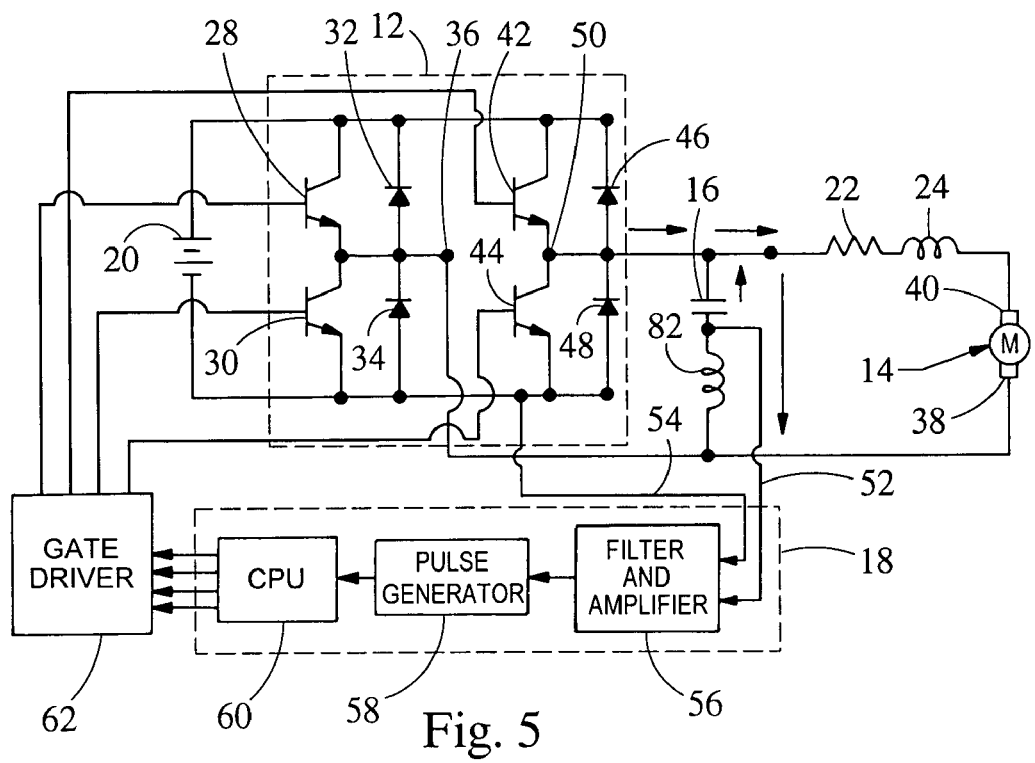
FIG. 5 is a schematic drawing illustrating yet another preferred embodiment of the present invention.
Figure 6:
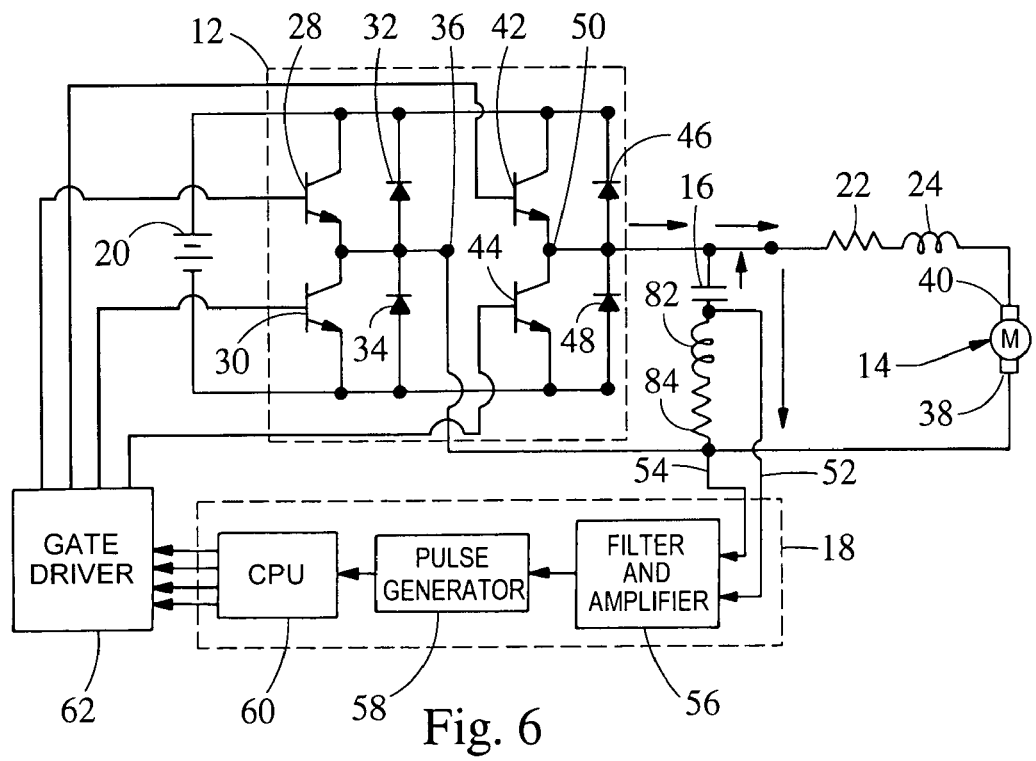
FIG. 6 is a schematic drawing illustrating yet another preferred embodiment of the present invention.

Referring now to FIG. 1, a system embodying the principles of the present invention is illustrated therein and designated at 10. The system 10 includes a power electronics switching circuit 12, a DC motor 14, a capacitor 16, and a ripple current detection apparatus 18. A power source 20, shown as an automotive battery, provides power to the switching circuit 12. The switching circuit 12 is shown as an H-bridge switching circuit, the details of which will be discussed further below. The switching circuit provides voltage to drive the motor 14. Resistor 22 and inductor 24 represent the effective resistance and inductance of the DC motor 14, respectively. A combination of capacitor 16 and impedance 26 is in electrical parallel connection with the motor 14 and the switching circuit 12. Further, an impedance 26 is connected in electrical series with the capacitor 16 across the motor 14. A first node 52 of the current ripple detection apparatus 18 is connected between the capacitor 16 and a first side of the impedance 26. A second node 54 of the current ripple detection apparatus 18 is connected to the second side of the impedance 26. The impedance 26 may be a resistor as shown in FIGS. 1 and 4, or an inductor as shown in FIG. 5, or both as shown in FIG. 6. The capacitive ripple current detection apparatus 18 is in electrical communication with the impedance 26 to measure the voltage drop across the impedance 26 and thereby infer the current through the capacitor 16 and detect capacitive current ripples corresponding to motor commutation. The capacitive current ripple detection apparatus 18 is in electrical communication with a gate driver 62 to provide a feedback loop. Signals received from the capacitive current ripple detection apparatus 18 and the gate driver 62 are used to control the switching circuit 12 based on the commutation of the motor as determined by the current ripples through capacitor 16.

Switching circuit 12 is an H-bridge power electronics converter, as known in the art. Though transistors (28, 30, 42, 44) and diodes (32, 34, 46, 48) are shown in FIG. 1 and FIGS. 4 to 6, MOSFET power switches can be readily used to replace the combinations of transistor and diode pairs, as commonly done in the art. Switching circuit 12 has a first parallel branch including transistor 28, transistor 30, diode 32, and diode 34. Transistor 28 has a collector connected to the positive side of the power source 20 and an emitter connected to node 36. Diode 32 is connected in electrical parallel connection with transistor 28 with the anode of diode 32 connected to node 36 and a cathode of diode 32 connected to the positive side of the power source 20. Transistor 30 has a collector connected to node 36 and a emitter connected to the negative side of power source 20. Diode 34 is connected in an electrical parallel connection with transistor 30 with the anode of diode 34 connected to the negative side of the power source 20 and the cathode of diode 34 connected to node 36. Node 36 is connected to a first terminal 38 of motor 14. The second terminal of motor 14 is in electrical communication with the second branch of the switching circuit 12.

The second branch of the switching circuit 12 includes transistor 42, transistor 44, diode 46, and diode 48. The collector of transistor 42 is connected to the positive side of the power source 20 and the emitter of transistor 42 is connected to node 50. Diode 46 is connected in electrical parallel connection with transistor 42 with the anode of diode 46 connected to node 50 and the cathode of diode 46 connected to the positive side of the power source 20. Transistor 44 has a collector connected to node 50 and an emitter connected to the negative side of power source 20. The diode 48 is connected in electrical parallel connection with transistor 44 with the anode of diode 48 connected to the negative side of power source 20 and the cathode of diode 48 connected to node 50. Node 50 is in electrical communication with the second terminal of the motor 14 through resistor 22 and inductor 24. Further, capacitor 16 and impedance 26 are connected in electrical series connection forming a branch in parallel with the motor 14 between the first and second terminal 38, 40. A first node 52 of the current ripple detection apparatus 18 is connected between the capacitor 16 and a first side of the impedance 26. A second node 54 of the current ripple detection apparatus 18 is connected to the second side of the impedance 26.

To detect the ripple current through capacitor 16, node 52 and 54 are connected to a filter and amplifier circuit 56 of the current ripple detection apparatus 18. The filter and amplifier circuit 56 measures the ripple current through the capacitor 16 by detecting a voltage across the impedance 26. The voltage signal is then filtered to eliminate high frequency noise. With the high frequency noise removed, the signal is amplified and the conditioned voltage signal is provided to a pulse generator circuit 58. The pulse generator circuit 58 generates a square wave pulse train corresponding to the commutation events of the motor 14. Though not necessary, it is preferred that the filter and amplifier circuit 56 is designed such that the pulse generator circuit does not respond to ripples associated with the post motor commutation pulses shown as reference numeral 76 in FIG. 2 and will be explained later. The output of the pulse generator circuit 58 is provided to an input capture port of a microprocessor 60. The microprocessor 60 counts the pulses and applies a position control algorithm that translates the pulse count information into motor position information to determine motor position. Accordingly, the motor position is provided to a feedback position control algorithm that is used to provide control signals to a gate driver 62. The gate driver 62 actuates the switching circuit 12 based on the control signals from the microprocessor 60 providing feedback position control of the motor.

Figure 2:
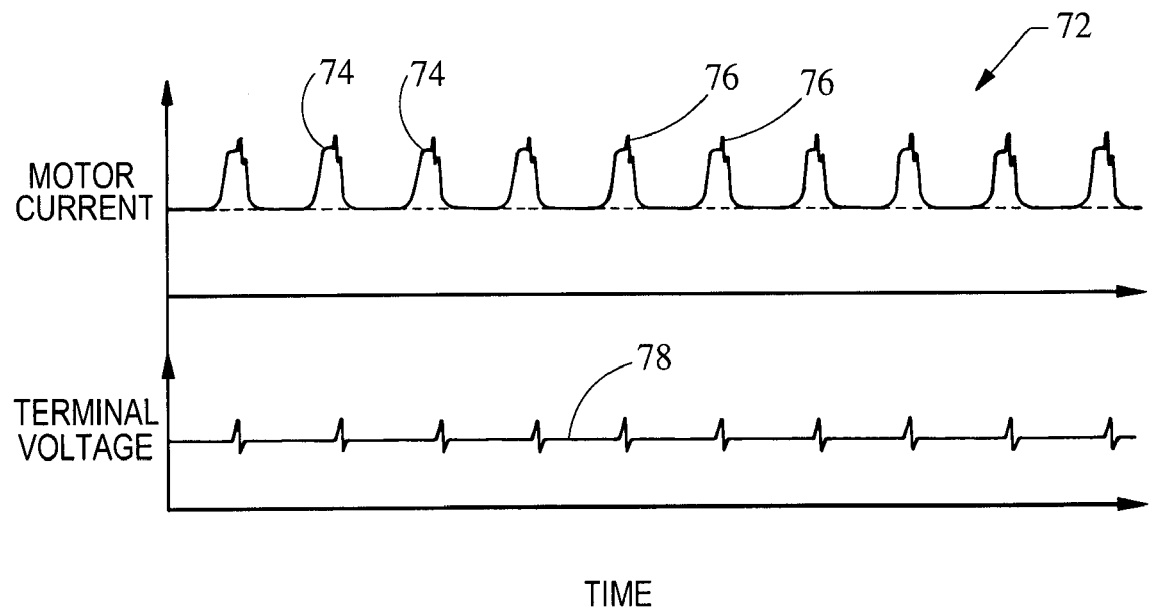
FIG. 2 is a plot of motor current and terminal voltage associated to a DC motor with limited number of armature coils.

For a DC motor with a small number of armature coils, there are pulse ripples in both the motor current waveform 72 and terminal voltage waveform 78 as illustrated in FIG. 2. The pulses in the terminal voltage waveform 78 are caused by delayed commutation of the armature coils. There are two types of pulses in the motor current waveform 72, intra commutation pulses 74 and post commutation pulses 76. Post commutation pulses 76 are mainly "narrow" spikes and contain very low electric energy but with rich high frequency harmonics. Post commutation pulses 76 generally are not consistent among high volume motors and are not consistent over the life span of the motor. The magnitude of post commutation pulses 76 are proportional to both speed and load of the motor. Intra commutation pulses 74 contain comparable amount of electric energy as the main electric power draw and do not contain much high frequency harmonics. The magnitudes of intra commutation pulses 74 mainly depend on the speed of the motor. Generally, intra commutation pulses 74 are consistent among high volume produced motors and over the life span of the same motor.

The frequency, $f_c$, of both post commutation pulses 76 and intra commutation pulses 74 are identical and are given by EQ. 1.

$$f_c = \frac{p n_c n_m}{30} \qquad \text{EQ. 1}$$

where
p=number of pole pairs;
$n_c$=Number of armature coils;
$n_m$=motor speed in RPM;

Therefore, if the frequency of either of the pulses are detected, the motor speed and motor position can be determined.

Figure 3:
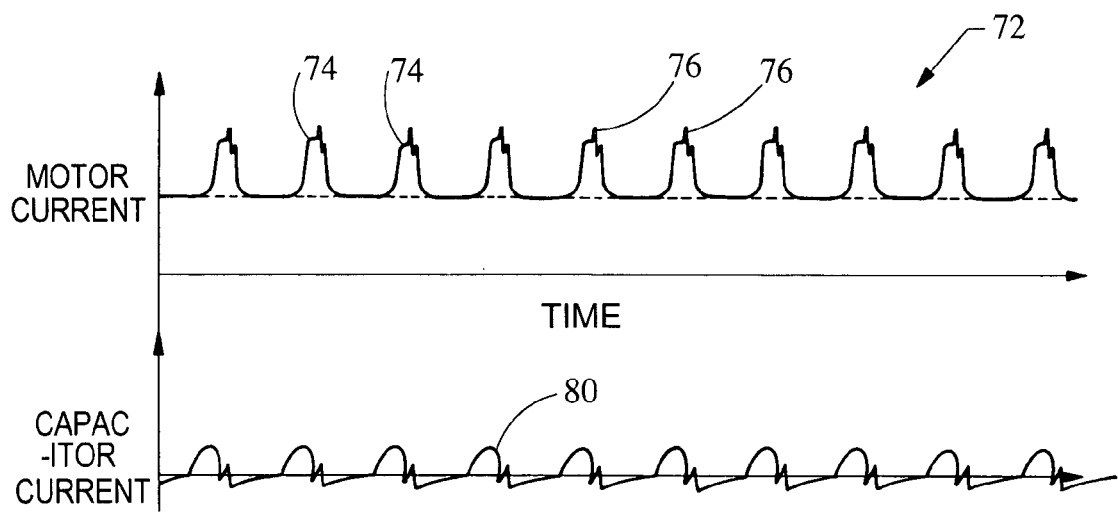
FIG. 3 is a plot demonstrating the relationship between commutation events or motor currents and current in the shunt capacitor.

To further promote the understanding of the operating principle of the present invention, FIG. 3 illustrates the motor current waveform 72 and a capacitor current waveform 80 for the schematics given in FIG. 1. If the capacitance of capacitor 16 is sufficiently high, capacitor 16 can source the entire ripple portion of the motor current. Whereas the current draw from the power supply 20 is maintained ripple-free. During the time intervals between the commutation events, capacitor 16 will be charged by the power supply 20. Based on this principle, the current in capacitor 16 sources the ripple or pulse currents caused by electric commutation of the motor 14 and can truly reflect the occurrence of a motor commutation event.

Now referring to FIG. 4, another configuration of the circuit provided in FIG. 1 is provided. The circuit in FIG. 4 is similar to the previously described circuit in FIG. 1, however, the connection of the current ripple detection apparatus 18 has been modified. The first node 52 of the current ripple detection apparatus 18 is connected between capacitor 16 and impedance 26, shown as a resistor. The second node 54 is connected to the negative side of power source 20.

Now referring to FIG. 5, another configuration of the circuit provided in FIG. 1 is provided. The circuit in FIG. 5 is similar to the previously described circuit in FIG. 1, however, impedance is shown as inductor 82. The first node 52 of the current ripple detection apparatus 18 is connected between capacitor 16 and a first side of inductor 82. The second node 54 is connected to the other side of inductor 82.

Now referring to FIG. 6, the circuit provided is similar to the circuit in FIG. 1, however, the impedance is shown as inductor 82 and resistor 84. Further, the connection of the current ripple detection apparatus 18 has been modified. The first node 52 of the current ripple detection apparatus 18 is connected between capacitor 16 and inductor 82. The second node 54 is connected to the negative side of power source 20.

As a person skilled in the art will readily appreciate, the above description is meant as an illustration of the principles this invention. This description is not intended to limit the scope or application of this invention in that the invention is susceptible to modification, variation and change, without departing from spirit of this invention, as defined in the following claims.

We claim:

1. A position detection system for a DC motor, the position detection system comprising:
    a switching circuit connected across a DC motor and configured to drive the DC motor;
    a capacitive impedance element in electrical parallel connection with the DC motor and the switching circuit;
    a capacitive current ripple detection apparatus in electrical communication with the capacitive impedance element to detect a ripple current through the capacitive impedance element corresponding to commutation of the DC motor; and
    an impedance connected in electrical series with the capacitive impedance element and in an electrical parallel connection across the DC motor.

2. The position detection system according to claim 1, wherein the impedance comprises a resistor.

3. The position detection system according to claim 1, wherein the impedance comprises an inductor.

4. The position detection system according to claim 1, wherein a first node of the capacitive current ripple detection apparatus is connected between the capacitive impedance element and a first side of the impedance.

5. The position detection system according to claim 4, wherein a second node of the capacitive current ripple detection apparatus is connected to the second side of the impedance.

6. The position detection system according to claim 4, wherein a second node of the capacitive current ripple detection apparatus is connected to a voltage reference.

7. The position detection system according to claim 1, wherein the capacitive current ripple detection apparatus is in communication with a gate driver to provide control signals for position feedback.

8. The position detection system according to claim 1, wherein the capacitive current ripple detection apparatus includes a filter and amplifier circuit configured to measure a voltage corresponding to the ripple current through the capacitive impedance element.

9. The position detection system according to claim 8, further comprising a pulse generator in electrical communication with the filter and amplifier circuit to receive a conditioned voltage signal and generate a pulse train corresponding to commutation events of the DC motor.

10. The position detection system according to claim 9, further comprising a microprocessor configured to receive the pulse train from the pulse generator and determine a motor position.

11. The position detection system according to claim 1, wherein the switching circuit includes an H-bridge switch configuration.

12. A position detection system for a DC motor, the position detection system comprising:
   a switching circuit connected across a DC motor and configured to drive the DC motor;
   a capacitive impedance element in electrical parallel connection with the DC motor and the switching circuit; and
   a capacitive current ripple detection apparatus in electrical communication with the capacitive impedance element to detect a ripple current through the capacitive impedance element corresponding to communication of the DC motor.

13. The position detection system according to claim 12, further comprising an impedance connected in electrical series with the capacitive impedance element in an electrical parallel connection across the DC motor.

14. The position detection system according to claim 13, wherein the impedance comprises a resistor.

15. The position detection system according to claim 13, wherein the impedance comprises an inductor.

16. The position detection system according to claim 13, wherein a first node of the capacitive current ripple detection apparatus is connected between the capacitive impedance element and a first side of the impedance.

17. The position detection system according to claim 16, wherein a second node of the capacitive current ripple detection apparatus is connected to the second side of the impedance.

18. The position detection system according to claim 16, wherein a second node of the capacitive current ripple detection apparatus is connected to a voltage reference.

19. The position detection system according to claim 12, wherein the capacitive current ripple detection apparatus is in communication with a gate driver to provide control signals for position feedback.

20. The position detection system according to claim 12, wherein the capacitive current ripple detection apparatus includes a filter and amplifier circuit configured to measure a voltage corresponding to the ripple current through the capacitive impedance element.

21. The position detection system according to claim 20, further comprising a pulse generator in electrical communication with the filter and amplifier circuit to receive a conditioned voltage signal and generate a pulse train corresponding to commutation events of the DC motor.

22. The position detection system according to claim 21, further comprising a microprocessor configured to receive the pulse train from the pulse generator and determine a motor position.

23. The position detection system according to claim 12, wherein the switching circuit includes an H-bridge switch configuration.

* * * * *

UNITED STATES PATENT AND TRADEMARK OFFICE
CERTIFICATE OF CORRECTION

| | | |
|---|---|---|
| PATENT NO. | : 7,064,509 B1 | Page 1 of 1 |
| APPLICATION NO. | : 11/079644 | |
| DATED | : June 20, 2006 | |
| INVENTOR(S) | : Zhenxing Fu et al. | |

It is certified that error appears in the above-identified patent and that said Letters Patent is hereby corrected as shown below:

Column 7, in claim 12, line 43, after "element corresponding to" delete "communication" and substitute --commutation-- in its place.

Signed and Sealed this

Twenty-first Day of November, 2006

JON W. DUDAS
*Director of the United States Patent and Trademark Office*